United States Patent [19]

Matsumura et al.

[11] Patent Number: 5,111,201

[45] Date of Patent: May 5, 1992

[54] SYSTEM RADIO TRANSMISSION OF LIQUID LEVEL DATA AND BATTERY SAVING TECHNIQUE

[75] Inventors: Hiroshi Matsumura; Norio Shimamura; Yasuto Ohta; Masaru Kawabe; Makoto Shimizu; Naoaki Natori; Naohiko Suzuki, all of Kanagawa, Japan

[73] Assignee: Tokyo Tatsuno Co., Ltd., Tokyo, Japan

[21] Appl. No.: 456,912

[22] Filed: Dec. 26, 1989

[30] Foreign Application Priority Data

Dec. 26, 1988 [JP] Japan .................. 63-329586
Mar. 13, 1989 [JP] Japan .................. 1-61314

[51] Int. Cl.⁵ .................. G01F 3/24; G01F 17/00; H04B 1/16; G08C 15/00
[52] U.S. Cl. .................. 340/870.380; 340/606; 455/343; 73/149; 73/221; 73/428
[58] Field of Search .................. 73/149, 221, 427, 428; 340/870.38, 624, 606; 455/343

[56] References Cited

U.S. PATENT DOCUMENTS

| | | | |
|---|---|---|---|
| 3,681,753 | 8/1972 | Whalen et al. | 340/870.38 |
| 4,094,437 | 6/1978 | Hayashida | 340/624 |
| 4,399,440 | 8/1983 | Douglas | 340/870.38 |
| 4,449,248 | 5/1984 | Leslie et al. | 455/343 |
| 4,513,617 | 4/1985 | Hayes | 340/870.38 |
| 4,571,998 | 2/1986 | Stegner | 340/624 |
| 4,716,463 | 12/1987 | Stacy et al. | 455/343 |
| 4,777,655 | 10/1988 | Numata et al. | 455/343 |
| 4,924,221 | 5/1990 | Filippone | 340/870.38 |

Primary Examiner—Donald J. Yusko
Assistant Examiner—Brian Zimmerman
Attorney, Agent, or Firm—Sughrue, Mion, Zinn, Macpeak & Seas

[57] ABSTRACT

System for radio transmission of level data of liquid contained in a tank and for converting to the level data to volume data to be indicated. A transmitter includes a cell for supplying electric power, a microcomputer connected to the cell and normally dept in a standby state in which it consumes a small amount of electric power. A timer is connected to the cell and the microcomputer to provide the latter with activation signals to place it in a activated state at a predetermined interval. A level detector if supplied with electric power from the cell only when the microcomputer is activated to provide the level data. A memory is continuously supplied with the electric power from the cell to memorize the level data, and a modulator supplied with the electric power from the cell only when the microcomputer is activated to transmit the level data in the memory by carrier waves through an antenna, whereby the system saves power consumption of the cell.

9 Claims, 9 Drawing Sheets

SYSTEM RADIO TRANSMISSION OF LIQUID LEVEL DATA AND BATTERY SAVING TECHNIQUE

TECHNICAL FILED AND RELATED ART

The invention relates to system for radio transmission of level data of liquid, such as fuel which is contained in a tank, such as an underground tank and for receiving the data to convert to volume data to be indicated for relevantly control liquid volume.

It has been used for a long time to provide a float to lie on the level of liquid in the underground tank, a tape one end of which is fixed to the float, a drum around which the other end portion of the tape is wound. Means are provided for urging the tape always in tension so as to determine the liquid level at a remote location according to the longitudinal movement which corresponds to up-and-down movement of the float on the liquid level in order to control the liquid volume. This is called hereafter "float-tape-drum" means.

The liquid level detected by the float-tape-drum mean is converted into an electric signal which is electrically transmitted to a monitor apparatus installed in an office of a gasoline station, which office is located far apart from the tank. The transmission of the signal is usually conducted by a cable. However, the wiring work for laying the cable necessitates taking-off of paving, laying of conduits, re-paving and so on, which are very costly.

When an electric supply fails, the electrical system can not function during the failure.

Furthermore, if liquid in the tank is volatile fuel, various electric elements must be carefully protected so as not to cause flaming or explosion. When it is to be applied to the existing facilities, the cost for application is to be fairly expensive.

M. R. Clarkson U.S. Pat. No. 4,459,584 discloses a system comprising a low level and a high-level permanent magnet, which are attached to the existing tape of the "float-tape-drum" means at the respectively relevant positions; a low-level and a high-level magnet sensor so as to detect the maximum and minimum levels of the fuel in the tank; an encoder-RF transmitter adapted to send the detected signals on the maximum and minimum levels; and an RF receiver-decoder stalled in a remote monitor station to indicate the received data on the both levels.

According to this system, however, it is difficult to relevantly control the level or the volume of fuel in the tank. For instance it might be necessary to resupply fresh fuel in preparation for an unusually large amount of fuel to be dispensed to many motor vehicles on nearly coming days before receiving the alarm on the minimum level. On the other hand tank lorries may have respectively varied pump-duct capacities so that it is not always easy to relevantly stop the fuel resupply so as to sufficiently fill the tank and not to overflow according to a fixed maximum level warning. It is difficult to attach so many magnets along the tape to be detected by the magnet sensor.

SUMMARY OF THE INVENTION

Thus, it is an object of the invention to provide a system comprising a radio transmitter for sending signals on the liquid level preferably arranged near the concerned tank and a radio receiver for receiving the signals on the liquid level to be changed to corresponding signals on the volume thereof to be indicated in the office.

It is another object to provide the system capable of saving power consumption of a cell as the electric source for the remitter by transmitting signals intermittently but fairly frequently when resupplying fresh fuel during which the level is fairly rapidly raised up and at longer intervals when the level is gradually lowered down by dispensing fuel to motor vehicles or not changed.

It is a further object of the invention to provide the system, in which the transmitter has means for detecting voltage drop in the cell down below a rated voltage so as to transmit warning signals to be indicated in the receiver.

It is the still other object to provide the system, in which the receiver has means for warning or taking emergent countermeasure when the receiver fails to receive the level signals from the transmitter in a predetermined time period.

It is also the object to provide the system, in which the transmitter is contained in a gas-tightly sealed casing which is removably mounted in a manhole of the concerned tank so that the casing is readily removed therefrom and brought to a location such as the office where the cell in the casing may be exchanged with a fresh one without fear of explosion.

BRIEF EXPLANATION OF THE DRAWINGS

The invention will be explained in more detail according to preferred embodiments in reference to accompanying drawings, in which.

PREFERRED EMBODIMENT OF THE INVENTION

Figure 1:
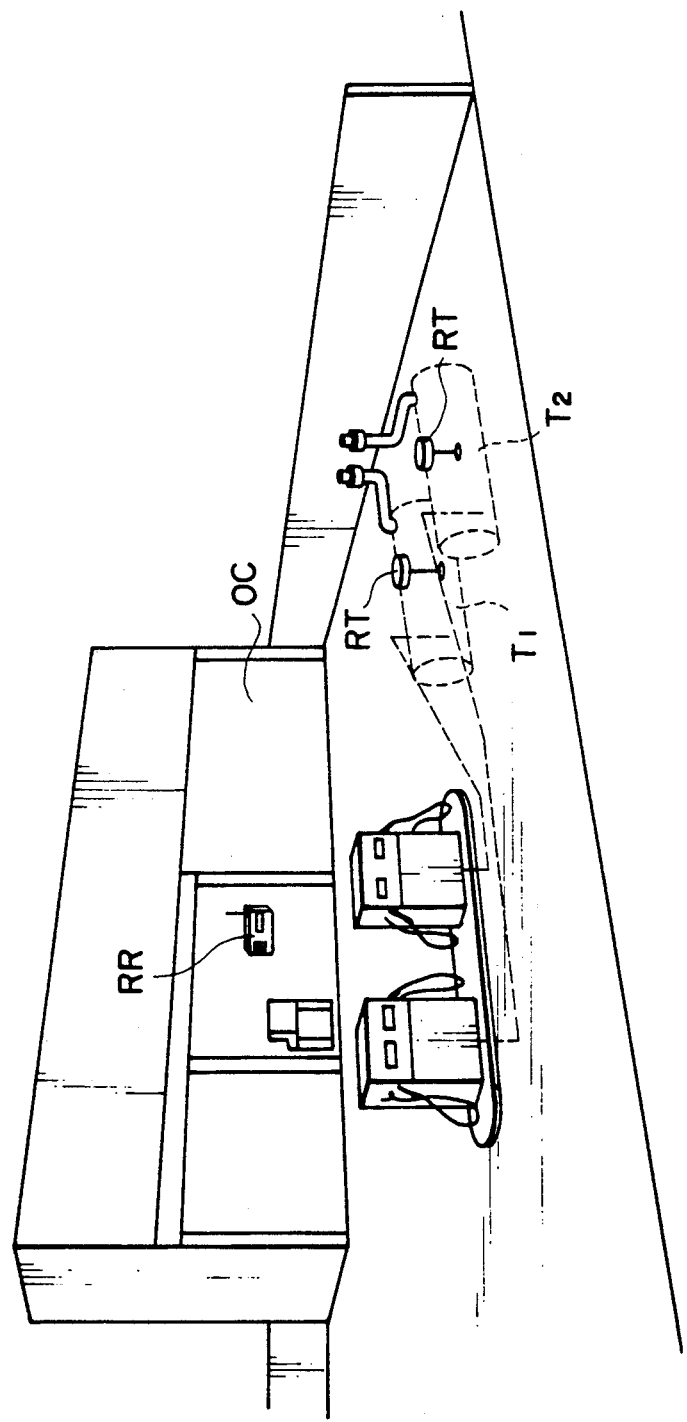
FIG. 1 is a perspective sketch of a gasoline station not exclusively but preferably to which the system of the invention is applied.

In reference to FIG. 1, there are provided in the gasoline station a plurality of, e.g. two underground tanks T1 and T2 for dispensing respectively different types of fuel, each of which is provided with a radio transmitter RT preferably contained in a manhole for the tank T1 (T2) so as to intermittently transmit frequency signals on carrier waves on the instant fuel level and other informations. A radio receiver RR is installed in an office OC remotely located from the tanks so as to receive the signals for calculating fuel volume therefrom to indicate the results and urging an operator to take necessary actions.

Figure 2:
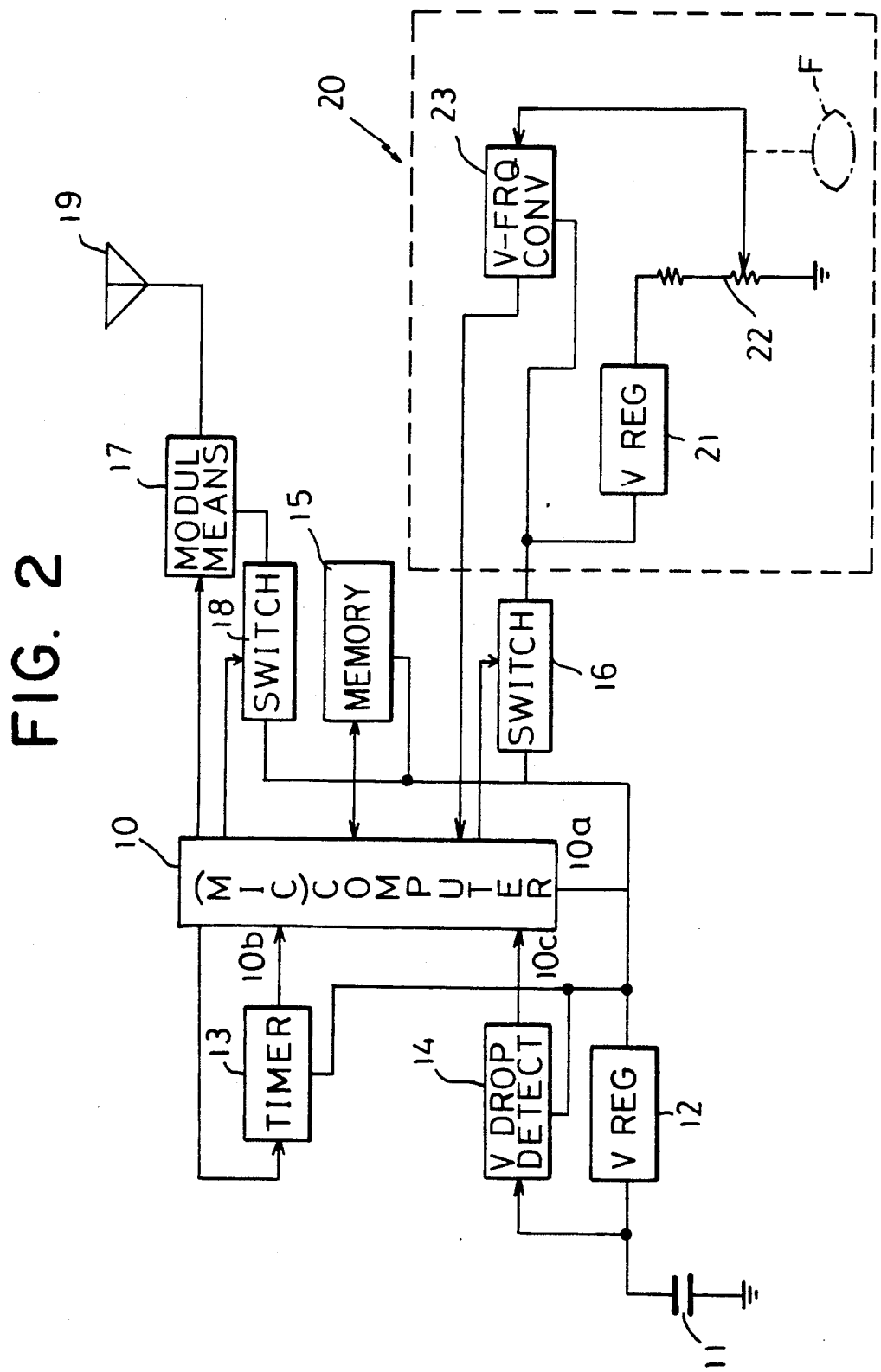
FIG. 2 is a circuit diagram of an embodiment of the transmitter according to the invention.

The radio transmitter RT illustrated in FIG. 2 comprises a control apparatus or a microcomputer 10 which has a power terminal 10a connected with an electric source such as a lithium cell 11 capable of applying a voltage higher than that necessary for operating the apparatus 10 via a voltage regulator 12 and an input terminal 10b for receiving an activation signal from a timer 13 consisting, for instance, of a condenser which is also connected with the cell 11 via the regulator. The microcomputer 10 may be cyclically brought in activated and standby states at predetermined interval To e.g. of 15 seconds, as shown in FIG. 5(I), so that, when necessary operations have been finished, the microcomputer is brought in a normal standby state.

The microcomputer 10 has a third terminal 10c for receiving a warning signal from a detector 14 which is adapted to detect the voltage drop of the cell 11 below a rated input voltage of the voltage regulator 12 and output the warning signal.

The microcomputer 10 is connected with a memory 15, which is always supplied with electric power from the cell 11 via the voltage regulator 12 to store liquid level data from means 20 for detecting liquid level.

The level detecting means 20 comprises another voltage regulator 21 which is connected with the cell 11 via a switch 16, a potentiometer 22 to be driven for rotation depending on up-and-down movement of a float F on the liquid level so as to vary the voltage given by the regulator 21 voltage-frequency convertor 23 outputs frequency signals which correspond to the varied voltages from the potentiometer 22, to be supplied to the microcomputer 10.

There is provided means for modulation 17 connected with the electric source 11 via the voltage regulator 12 and with the microcomputer 10 via a second switch 18, which may be turned ON by a signal from the apparatus 10 so that the activated means 17 may modulate the carrier waves for transmitting the measured data as frequency signals from an antenna 19.

Figure 3:
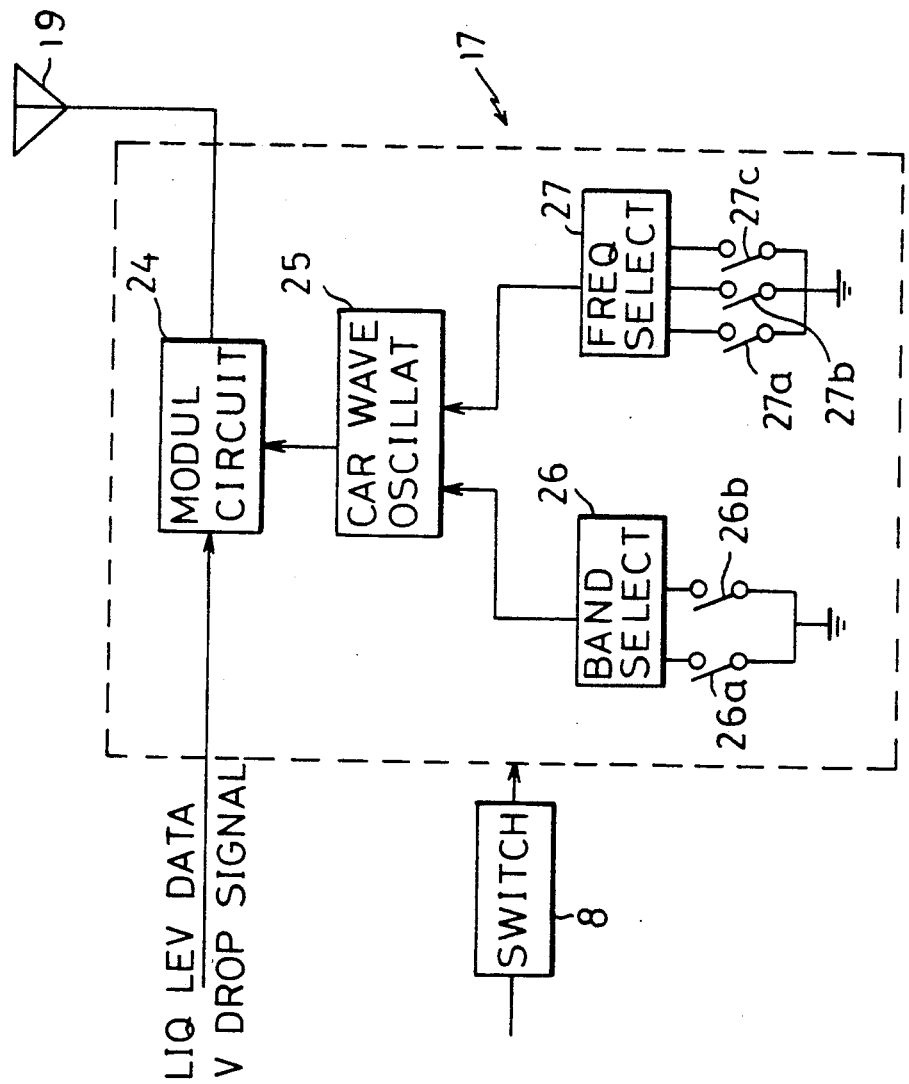
FIG. 3 is a circuit diagram of an embodiment of the means for modulation and transmission in FIG. 2.

FIG. 3 shows an embodiment of said modulating means 17, which comprises a modulator circuit 24 for receiving liquid level data and/or voltage drop signal from the microcomputer 10 as well as carrier waves from an oscillator circuit 25 so as to transmit the corresponding frequency signals. The oscillator circuit is preferably connected with a band setting circuit 26 having a plurality of e.g. two switches 26a, 26b and a frequency setting circuit 27 having a plurality of e.g. three switches 27a, 27b, 27c so as to select a particular band width in order to avoid a possible interference with neighbouring radio apparatus and a particular frequency in the selected band width in order to distinguish the signals of any one tank, e.g. tank T1 from those of the other tanks T2,T3.

Figure 4:
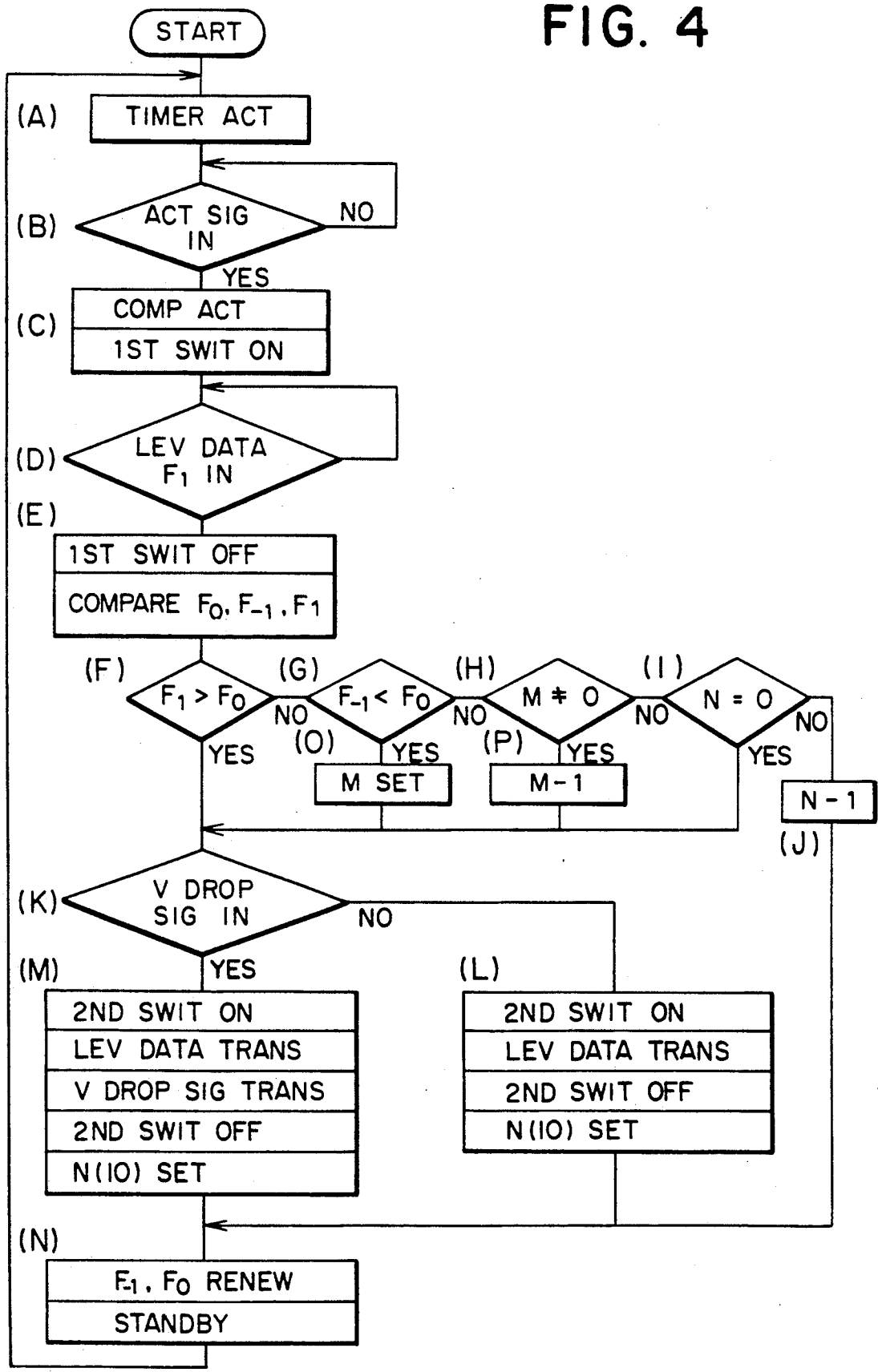
FIG. 4 is a flow chart showing operation of the transmitter of the invention, FIGS. 5 I, II and III respectively show timing for activating the microcomputer in the transmitter for transmitting the data of rapidly rising liquid level and for transmitting the data of gradually lowering liquid level.

In operation of the radio transmitter RT of the arrangement as referred to above, when the power is supplied from the cell 11 to the microcomputer 10, this is placed in the standby state where the signal for activation thereof can be received from the timer 13 and the timer 13 itself starts its operation (Step A in FIG. 4). When the time reaches the predetermined time To e.g. of 15 seconds, the timer 13 is adapted to output the activation signal (Step B in FIG. 4, I in FIG. 5), whereby the microcomputer 10 is placed in the activated state so as to turn the first switch 16 ON so as to supply electric power from the cell 11 to the liquid level detector 20 (Step C). In the level detector 20, the voltage signals from the potentiometer 22, which correspond to liquid level just determined, are converted to frequency signals by 15 virtue of the convertor 23 so that the level data $F_1$ is inputted in the microcomputer 10 (Step D).

Then, the first switch 16 is turned OFF so that the power supply to the level detecting means 20 is shut and the level data $F_0$ of the last time which is stored in the memory 15 is compared with the data $F_1$ and further with the stored level data $F_{-1}$ of the two times earlier than that (Step E).

Figure 5:
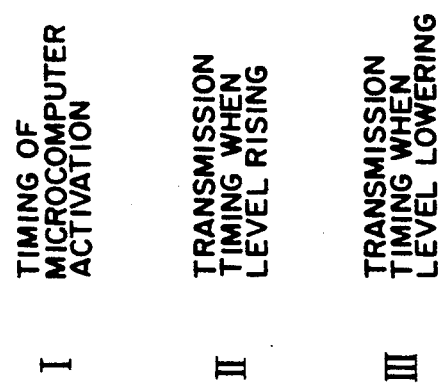

When the tank is not resupplied with fresh fuel e.g. by the tank lorry, i.e. the liquid level in the tank is lowered or not changed, the level signal transmission is conducted at long time intervals $T_2$ as shown in FIG. 5(III), and the reply to ($F_1 > F_0$?) in Step F is to be No and ($F_{-1} < F_0$?) in Step G is also to be No.

If a number M, explained herein later for convenience of the explanation, is zero at the present, the reply to ($M \neq 0$?) is to be No (Step H). Then, when the microcomputer 10 has not yet activated by a predetermined number (N=10, for instance), that is, when any of the numbers 1 to 10 is still memorized in the memory 15 after the latest level signal transmission was conducted, the reply to (N=0?) in Step I is to be No.

Then, the existing number N is decreased by one and the resultant number is memorized in the memory 15 (Step J), and the values $F_{-1}, F_0$ are renewed (Step N). After which the microcomputer 10 is put in the standby state until the timer 13 gives the signal again activating thereof.

When N turns to zero as a result of repetitions of decrease, the reply to (N=0?) in Step I is Yes. Then if the warning signal is not inputted from the detector 14, therefore, if the reply to (Voltage Drop Signal Inputted?) is No (Step K), the second switch 18 is turned ON so as to energize the modulating means 17 to remit the liquid level data. The second switch 18 is turned OFF and the number N=10 is set again (Step L).

If the power cell 11 has been consumed for a few years so that the output voltage drops below the rated value, the warning signal is inputted from the detector 14 so that the reply in Step K is Yes. Thus, the concerned signal is transmitted after the level signal transmission, the second switch is turned OFF and the number N=10 is set in the memory 15 (Step M).

When the operations in Step M or Step L have been finished, the liquid level data $F_{-1}$, $F_0$ are renewed and the microcomputer 10 is automatically turned in the standby state (Step N) until the next activation signal is given from the timer. When microcomputer 10 is in the standby state, it consumes only a small amount of electric power only a little and the modulating means 17, level measuring means 20 are kept in the passive state so as to save useless consumption of the electric source.

When the tank is resupplied with fuel from the tank lorry, the liquid level is rapidly raised so that the reply in Step F is Yes. Thus, if the reply in Step K is No, the second switch 18 is turned ON so as to transmit the level data and then the switch is turned OFF. The level data stored in the memory 15 is renewed and the computer 10 is put in the standby state. In Step K, if the reply is Yes, the voltage drop signal is transmitted in addition to the transmission of the liquid level signal.

In this case, as shown in FIG. 5 (II), the transmission of the liquid level signal is made more frequently and every time when the microcomputer is energized different from the case where the liquid level is being lowered or not changed to relevantly comply with the rapid rise of the level for preventing fuel from overflowing.

When the resupplying of fuel is over, the reply in Step F is No and the reply in Step G is Yes. The number M e.g. 12 is set in the memory 15 so that the transmission of the liquid level data may be made M times (12 times) every when the computer 10 is activated (Step 0). The reason why such number is set is explained later in reference to FIG. 7. Since the liquid level is lowered or not changed after that, the reply in Step F and Step G in the next time is both No so that the operation in Step H is in question. Since $M=12$ is set as referred to above, the reply to (M0≠0?) is to be Yes, so that 12 is reduced by one to be 11 (Step P). Thus the operations of Step (M) or (L) are repeated through Step (K) until the set number M turns to zero.

Figure 6:
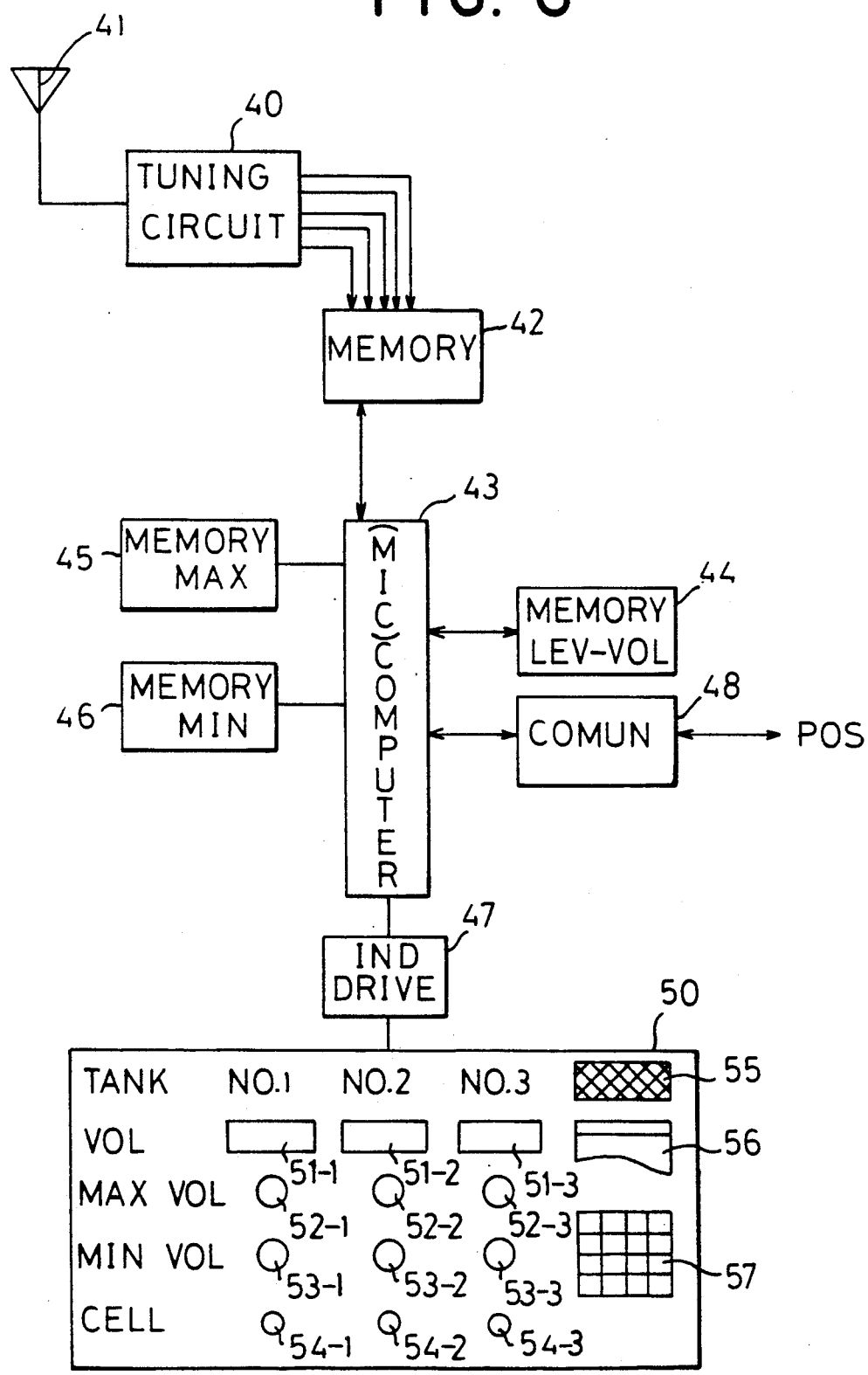
FIG. 6 is a circuit diagram of an embodiment of the receiver according to the invention.

FIG. 6 illustrates an embodiment of the radio receiver RR according to the invention, in which a receiver tuning circuit 40 having an antenna 41 is adapted to receive data through a plurality of channels transmitted respectively from the corresponding number of the underground tanks and to be demodulated for giving the corresponding number of outputs.

The respective outputs on the liquid level data and the voltage drop warning signal are stored in the respective addresses in a memory 42. The stored information is respectively read by a reading means of a microcomputer 43. The microcomputer 43 is connected with a memory for information necessary for conversion 44 which converts data on the liquid level to those on the liquid volume based on information stored therein in advance as to the respective tanks. There are arranged memories 45 and 46 which are respectively connected with the microcomputer 43 and stored in advance with maximum and minimum liquid volumes in the respective tanks. The microcomputer 43 is connected with a transmission circuit 48 for communication, when necessary, with a point of sales (POS), and also connected with an indicator board 50 via means 47 for driving the indicators.

The indicator board 50 has indicators 51-1, 51-2, 51-3 showing the present liquid volumes respectively in the underground tanks $T_1$, $T_2$, $T_3$, indicators 52-1, 52-2, 52-3 and indicators 53-1, 53-2, 53-3 respectively for warning that the liquid volumes in the respective tanks reaches or is going to reach the maximum and minimum volumes, and indicators 54-1, 54-2, 54-3 for warning that the voltage of the cell 11 of the respective radio transmitter RT drops below the rated value. The board 50 may be provided further with a buzzer 55 for providing a warning, a printer 56 for outputting the respective liquid volumes and keys 57 for setting all types of data in the memories in advance.

Figure 7:
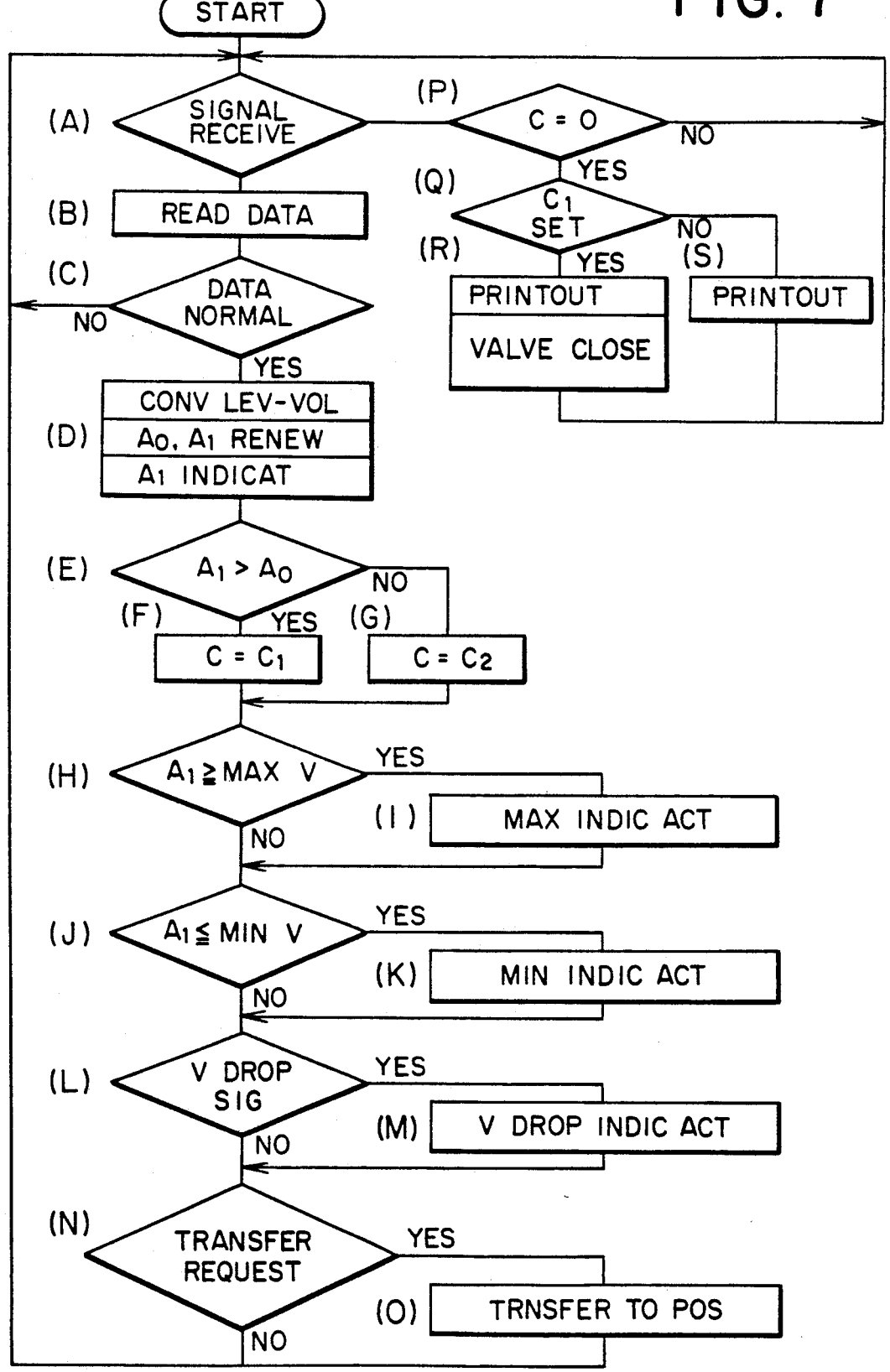
FIG. 7 is a flow chart showing operation of the receiver of the invention.

In operation of the receiver RR referring to FIG. 7, the frequency signals transmitted by the radio transmitter RT are received by the antenna 41 and introduced into the demodulation means 40 so that the liquid level data as well as voltage drop signal when involved are stored in the respective address of the memory 42 and renewed every when the second signals arrive (Step A) to be read by the microcomputer 43 (Step B).

When the reply to (DATA NORMAL?) where the data involve foreign or disturbance data e.g. caused by noise is Yes (Step C), the liquid level is converted to the liquid volume based on the information stored in the memory 44, the before-last volume data and the last volume data are renewed in the memory 42 so that the latter memorizes the last volume data $A_0$ and the present volume data A1, and then the renewed volume data $A_1$ is indicated (Step D).

When the above volume data $A_1$ is compared with the volume data $A_0$ (Step E), and if the reply to ($A_1 > A_0$?) is Yes where the liquid volume is being increased, a time C is set as C1 (e.g. 1 minute) (Step F) and if the reply is N where the liquid volume is being decreased or not changed, a time C is set as C2 (e.g. 10 minutes) (Step G).

Then the volume data $A_1$ is compared with the maximum volume and the minimum volume respectively stored in the memory 45, 46 (Steps H,J). When the reply is Yes, the respective indicator 52, 53 of the concerned channel are energized to give warning (Steps I.K.).

When the signals showing the voltage drop are involved in the received signal, the concerned signal is stored in the corresponding address of the memory 42 so that, when the reply to (Voltage Signal?) is Yes (Step L), the concerned warning s indicated on the board 50 (Step M).

When it is requested from POS to transmit the data (Step N), the necessary data is sent (Step 0).

When the liquid level in the tank is being lowered or not changed, the level signal should arrive every 150 seconds, (15sec.×N(10)). When the tank is resupplied from the tank lorry so that the level is being raised, the signal should arrive every 15 seconds, so that, although the memorized time $C_1$ or $C_2$ is decreased second by second as time goes by, the time C ($C_1$ or $C_2$) can not be turned to zero since the time C1 or C2 is reset in every arrival of the level signal. Namely the reply to (C=0?) is to be No in Step P.

In the case where no signal arrives or normal signal is not entered into the microcomputer 43 within the set time C ($C_1=1$ minute or $C_2=10$ minutes) despite that, which may be caused from the transmitter trouble,noise interference and the like, the reply to (C=0?) in Step P is to be Yes.

It becomes necessary in this case to confirm whether or not the liquid level is being raised by inquiring (C1 set?) (Step Q). If the reply is Yes which means that the tank is being resupplied from the tank lorry so that level is being rapidly raised, it is necessary not only to inform the situation e.g. by printing out the concerned message by the printer 56 but also to shut a valve to the tank in order to avoid possible fuel overflow (Step R), preferably together with buzzering by the buzzer 56. Tank lorries are generally provided with a mechanism to stop the pump in reply to rapid rising of pressure. If the reply is No in Step Q, there is no necessity to take urgent countermeasures so that the situation is informed only e.g. by printing out the concerned message (Step S) preferably together with buzzering.

Immediately after the resupplement of fresh fuel has been finished, namely the reply to ($F_1 > F_0$?) in Step F in the transmitter RT (FIG. 4) is changed from Yes to No, the transmitter RT, which has transmitted the level signals every 15 seconds (N=1), start to send the signals in a longer transmission interval, for example every 150 seconds (N=10) as referred to above, if there is not Steps G, H, O and P.

The receiver RR is, however, still maintained to give warning (Step R in FIG. 7) when no signal arrives in every one minute because the reply to (C1 set?) in Step Q (FIG. 7) is still Yes. In order to avoid such undesirable erroneous warning it is necessary to set the number M (e.g. 12) in the memory 15 in Step O (FIG. 4), when ($F_1>F_0$) in Step F is No and ($F_{-1}<F_0$) in Step G is Yes, to transmit the level signals every 15 seconds still M (12) times even if the reply to ($F_1>F_0$?) is changed to No. The number M in the memory 15 is decreased one by one in Step P in every activation of the microcomputer 10 until it comes to zero. Thereafter, the transmitter RT sends the signals in the longer transmission interval through Steps F, G, H, I.

Figure 8:
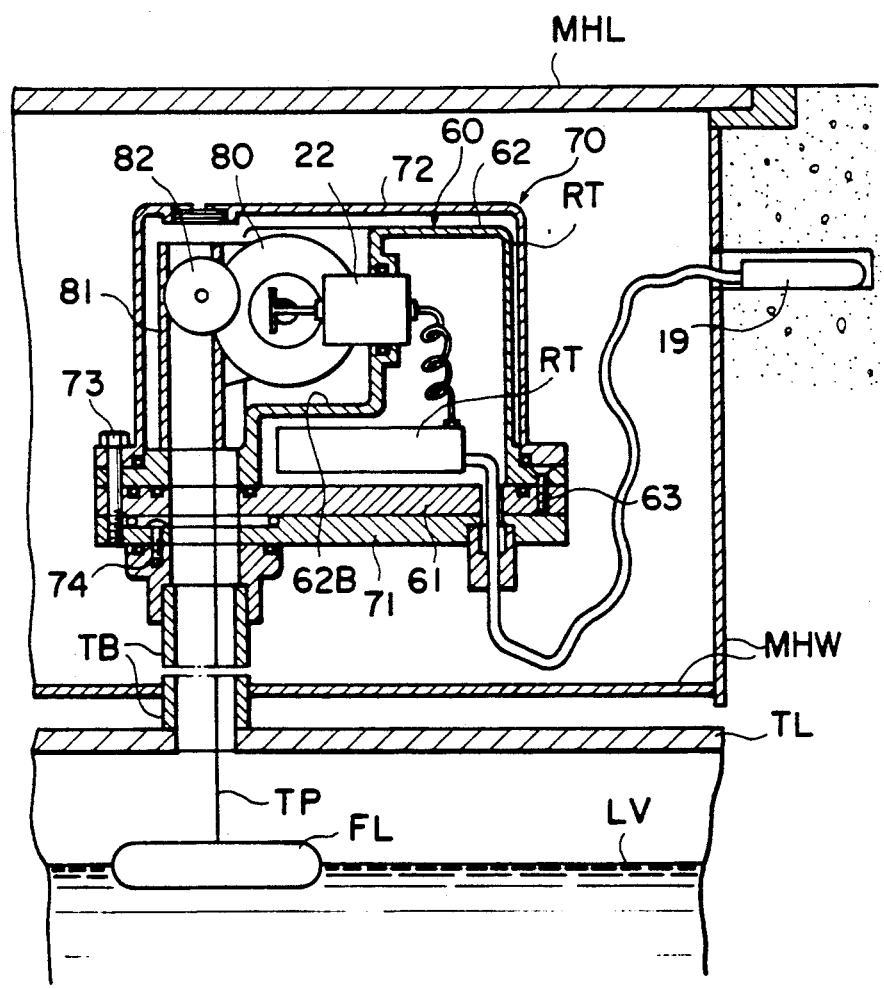
FIG. 8 is a side elevation of the tank manhole mounted with the transmitter of the invention and conventional float-tape-drum means.
Figure 9:
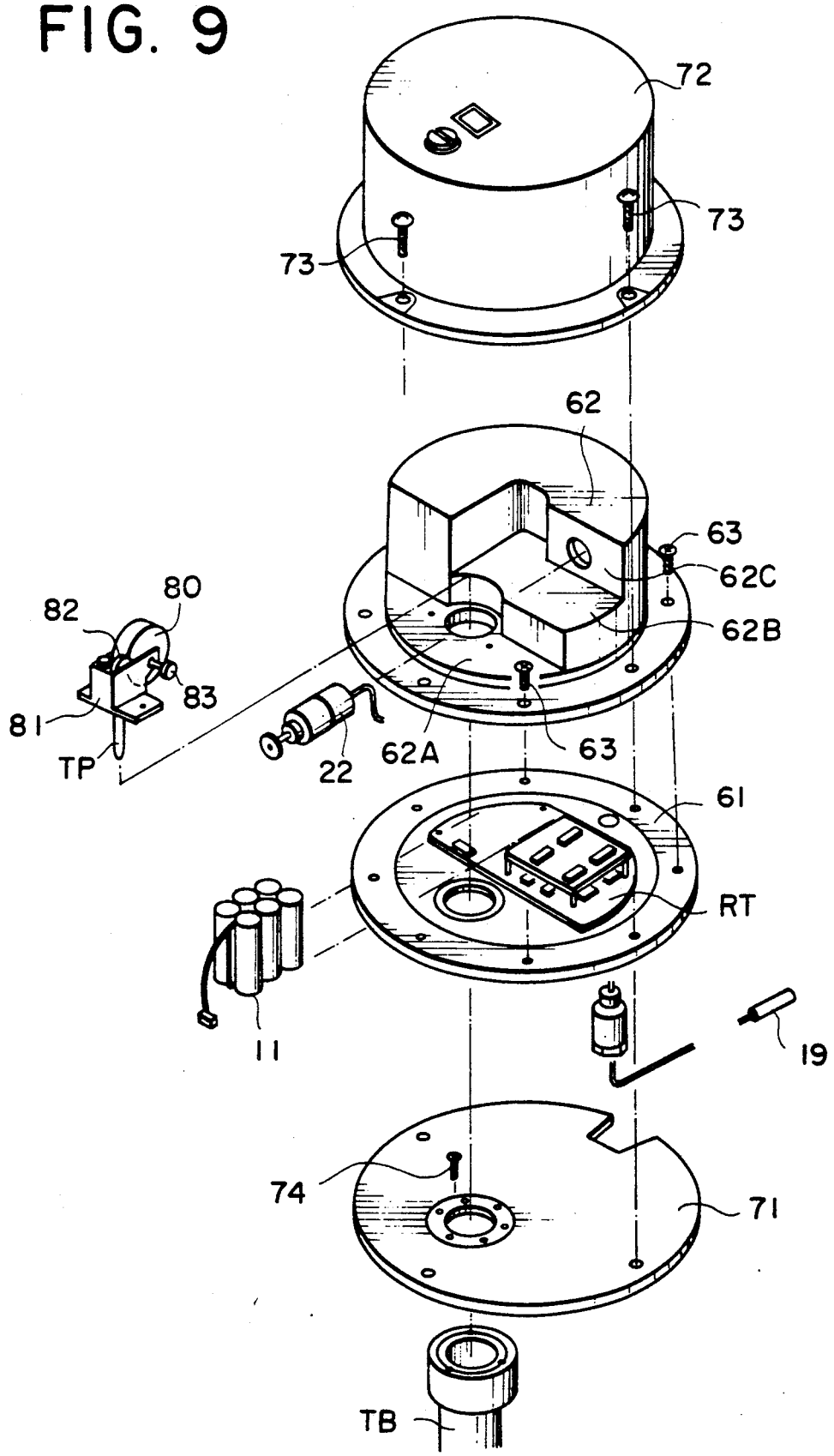
FIG. 9 is a perspective view of members of an inner casing containing the transmitter of the invention and of an outer casing in exploded state.

Now in reference to FIGS. 8 and 9, it is explained how the radio transmitter RT of the invention is located relative to the respective underground tank according to another aspect of the invention.

The radio transmitter RT is preferably contained in a gas tightly sealed inner casing 60 which is covered with an outer casing 70 which is fixedly mounted in a manhole defined by an iron lid MHL which is flush with the ground level in the gasoline station, iron side walls and an iron bottom wall MHW, and arranged above the tank TL.

The float FL is on a level LV of the liquid such as fuel to be dispensed and resupplied, and fixed with an end of an extended tape TP, the other end portion of which is wound around a drum 80, which is mounted on a bracket 81 for rotation which is mounted further with a spring 82 so as to keep the tape TP always in tension despite the up-and-down movement of the float FL. The assembly well known itself is mounted on the inner casing 60 to be covered with the outer casing 70. The drum 80 has a shaft fixed therewith and mounted with a gear 83 so that the potentiometer 22 arranged nearby and gearingly engaged therewith may be rotated for varying voltage corresponding to varied liquid level.

The outer casing 70 comprises a base member 71 preferably in the form of a disc and a flanged box 72 preferably in the form of a hat to be fixed with each other e.g. by plurality of bolts 73 at the peripheral flange or the brim. The disc 71 is gas tightly fixed on the upper end of a vertically protruded tube TB, through which the tape TP passes, e.g. by bolts 74 and an O-ring. The disc 71 is naturally formed with a hole for the tape to pass therethrough.

The inner casing 60 comprises a base member 61 preferably in the form of a disc and a flanged box 62 preferably in the form of a hat to be gas-tightly engaged with each other at the peripheral flange or the brim e.g. by a plurality of bolts 63. The hat-like box 62 is partly cut off and partly stepped so as to form a low flat portion 62A where a hole is correspondingly formed for the tape TP and a higher stepped portion 62 B on which a vertical wall 62C of the flanged box 62 stands. The wall 62C is formed with a hole in which the potentiometer 22 is gas-tightly inserted e.g. by an O-ring so that a shaft thereof may be protruded out of wall 62C. The drum assembly is mounted on the flat portion 62A to be readily removed so that the drum 80, around which the tape TP passing the hole, may be positioned above the stepped portion 62B and so that the gear 83 of the drum 80 may drivingly engage with the potentiometer shaft mounted with a gear.

The inner base member 61 carries the radio transmitter RT fixedly and the cell or cells 11 removably thereon, the latter of which is electrically connected with the former for supplying electric power. The radio transmitter RT is electrically connected further with the potentiometer to convert the varied voltages to the frequency signals to be transmitted through the antenna 19, which is preferably positioned in a groove formed in the earth outside of the tank and connected with the RT by a sheathed wire.

When the signal is given on the indicator of the radio receiver RR for warning the voltage drop of the cell to be exchanged with the new one, the manhole lid of the underground tank in question is lifted up, the bolts 73 are disengaged and the uppermost flanged box 72 is brought up, whereby the gas-tightly sealed casing 60 containing the cell as well as electronic elements may be removed from the lowermost base member 71. The casing 60 is brought to any place where exchange of the cell can be made without a fear of explosion e.g. in the office cabin, together with the tape and float or after the drum assembly is removed together with the tape and the float from the casing.

What is claimed is:

1. System for radio transmission of liquid level data and for converting the received data to liquid volume data to be indicated, comprising;

a transmitter comprising a cell electric source, first means intermittently supplied with electric power from the source to convert liquid level data to corresponding electric signals, second means intermittently supplied with electric power from the source to convert said corresponding electric signals to corresponding frequency signals, modulation means intermittently supplied with electric power from the source to transmit the received frequency signals on carrier waves through an antenna, a computer normally maintained in a standby state, timer means for intermittently providing activation signals to the computer to place it in an activated state at a predetermined interval, and means for storing the last liquid level data to be inputted in the computer so that when the computer is activated said first means is actuated to give the electric signals representing the present level data to be inputted in the computer for comparison of the two data, wherein a transmitting period is selected to be longer in case where the last liquid level is higher than the present level and shorter in case where the last liquid level is lower than the present level, and after the transmission is over the last level data are cleared and the new level data are stored in said storing means; and a receiver essentially comprising first means for demodulation of the received frequency signals through an antenna, second means for storing data necessary for conversion in advance so as to convert the received liquid level data to liquid volume data, an indicator including the volume data, and wherein the storing means is adapted to set a counter number when detecting that the liquid level is not being raised up by comparison of said two level data so that the set number is decreased by one when the computer is activated to reach zero and then firstly the level signals are transmitted.

2. System as claimed in claim 1, in which said transmitter further comprises voltage regulator means supplied with electric power from the electric source at a rated voltage to act as the electric source and means for detecting voltage drop of the cell below the rated voltage to output electric signals and which are converted by said second means transmitted by said modulation means so that the receiver may convert the received signals to be indicated as warning signals.

3. System as claimed in claim 1, in which said first means of the transmitter is a rotary potentiometer having a shaft drivingly connected with a float-tape-drum assembly and a resistance arranged so that when the shaft is rotated depending on liquid level change, the rated voltage intermittently applied from the electric source is correspondingly varied to be used as the electric signal.

4. System as claimed in claim 1, in which the receiver further comprises a microcomputer arranged between said first means and said indicator and connected in series, means for storing a maximum liquid level and means for a minimum liquid level respectively in advance and respectively connected with the microcomputer so that when the received level data reaches the maximum or the minimum level, a respective signal is given to the indicator.

5. System as claimed in claim 4, in which said microcomputer is adapted to provide a warning when failing to receive the level signals in a respectively predetermined time period.

6. System as claimed in claim 5, wherein the predetermined time period is set relatively longer for the case where the liquid level is not being raised up and relatively shorter for the case when the liquid level is being raised up so as to shut a valve for resupply of fresh liquid in addition to giving warning.

7. System as claimed in claim 5, in which microcomputer of the transmitter is adapted to set a count number when detecting the resupply of liquid is over by comparing the stored last level data with the present time level data and with the stored two times earlier level data to transmit the corresponding number of the level signals thereafter in order to avoid erroneous warning to be otherwise given by the microcomputer of the receiver.

8. System as claimed in claim 1, in which said transmitter is contained in an gas-tightly sealed casing, said casing mounted in a manhole of the tank, and a lead connection the transmitter with the antenna is extended out of the casing so that the antenna may be positioned out of the manhole.

9. System as claimed in claim 8, in which said casing has a base disc supporting the transmitter fixedly and the cell removable thereon a removable flanged hollow cylinder and gas-tightly engaged together, which is covered by an outer casing having a base disc and a flanged hollow cylinder to be removably engaged together, said outer base disc fixedly mounted in the tank manhole so that when the outer casing ay be readily brought out of the manhole for exchanging of the cell.

* * * * *